United States Patent
Greimel-Rechling et al.

(10) Patent No.: US 11,022,487 B2
(45) Date of Patent: Jun. 1, 2021

(54) OPTICAL SENSOR ARRANGEMENT AND METHOD FOR LIGHT SENSING

(71) Applicant: ams International AG, Rapperswil (CH)

(72) Inventors: Bernhard Greimel-Rechling, Gleisdorf (AT); Peter Bliem, Premstätten (AT); Herbert Lenhard, Graz (AT); Josef Kriebernegg, Graz (AT); Joachim Lechner, Margarethen an der Raab (AT); Christian Halper, Olbendorf (AT)

(73) Assignee: AMS INTERNATIONAL AG, Rapperswil (CH)

( * ) Notice: Subject to any disclaimer, the term of this patent is extended or adjusted under 35 U.S.C. 154(b) by 179 days.

(21) Appl. No.: 16/325,460

(22) PCT Filed: Aug. 7, 2017

(86) PCT No.: PCT/EP2017/069915
§ 371 (c)(1),
(2) Date: Feb. 14, 2019

(87) PCT Pub. No.: WO2018/033419
PCT Pub. Date: Feb. 22, 2018

(65) Prior Publication Data
US 2019/0212194 A1 Jul. 11, 2019

(30) Foreign Application Priority Data
Aug. 17, 2016 (EP) .................................. 16184579

(51) Int. Cl.
*G01J 1/46* (2006.01)
*G01J 1/18* (2006.01)
*G01J 1/44* (2006.01)

(52) U.S. Cl.
CPC . *G01J 1/46* (2013.01); *G01J 1/18* (2013.01); *G01J 2001/444* (2013.01); *G01J 2001/446* (2013.01); *G01J 2001/4426* (2013.01)

(58) Field of Classification Search
CPC ........ G01J 1/46; G01J 1/18; G01J 2001/4426; G01J 2001/444; G01J 2001/446
See application file for complete search history.

(56) References Cited

U.S. PATENT DOCUMENTS

| | | | |
|---|---|---|---|
| 8,625,012 B2 * | 1/2014 | Yuan | H04N 5/365 348/296 |
| 10,249,656 B2 * | 4/2019 | Panicacci | H03M 1/1245 |

(Continued)

FOREIGN PATENT DOCUMENTS

| | | |
|---|---|---|
| EP | 3 135 196 | 8/2015 |
| EP | 2 990 826 | 3/2016 |

OTHER PUBLICATIONS

European Patent Office, International Search Report for PCT/EP2017/069915, dated Nov. 20, 2017.

*Primary Examiner* — Seung C Sohn
(74) *Attorney, Agent, or Firm* — MH2 Technology Law Group LLP (57) ABSTRACT

An optical sensor arrangement comprises a photodiode (11), an integrator (12) with an integrator input (15) coupled to the photodiode (11), a comparator (13) with a first input (18) coupled to an integrator output (16) of the integrator (12), and a reference capacitor circuit (14) that is coupled to the integrator input (15) and is designed to provide a charge package to the integrator input (15). In a start phase (A), charge packages are provided to the integrator input (15), until a comparator input voltage (VIN) at the first input (18) of the comparator (13) crosses a comparator switching point.

14 Claims, 4 Drawing Sheets

(56) References Cited

U.S. PATENT DOCUMENTS

| | | | |
|---|---|---|---|
| 2008/0048100 A1* | 2/2008 | Bamji | ............... H04N 3/155 250/214 A |
| 2015/0083896 A1 | 3/2015 | Xu | |
| 2015/0102209 A1 | 4/2015 | Xu et al. | |
| 2015/0326805 A1 | 11/2015 | Scott et al. | |
| 2015/0377698 A1 | 12/2015 | Xu | |
| 2016/0079447 A1 | 3/2016 | Kriebernegg et al. | |

* cited by examiner

OPTICAL SENSOR ARRANGEMENT AND METHOD FOR LIGHT SENSING

BACKGROUND OF THE INVENTION

The present patent application is related to an optical sensor arrangement and to a method for light sensing.

An optical sensor arrangement often comprises a photodiode as a light detector and measures a photocurrent flowing through the photodiode. The optical sensor arrangement may convert the photocurrent into a digital signal. For example, the optical sensor arrangement may be realized as a light-to-frequency circuit, also called light-to-frequency machine, abbreviated LTF machine. A starting point of such an optical sensor arrangement has a large influence on the accuracy of the detected digital signal.

SUMMARY OF THE INVENTION

In an embodiment, an optical sensor arrangement comprises a photodiode, an integrator, a comparator and a reference capacitor circuit. An integrator input of the integrator is coupled to the photodiode. A first input of the comparator is coupled to an integrator output of the integrator. The reference capacitor circuit is coupled to the integrator input and is designed to provide a charge package to the integrator input. In a start phase, charge packages are provided to the integrator input, until a comparator input voltage at the first input of the comparator crosses a comparator switching point of the comparator.

Advantageously, at the end of the start phase, the comparator input voltage at the first input of the comparator is very near to the comparator switching point. Thus, the comparator input voltage is well defined. After the comparator input voltage crosses the comparator switching point, no more charge packages are added to the integrator input in the start phase.

The reference capacitor circuit may comprise a reference source for providing a first reference voltage.

In an embodiment, the comparator input voltage at the first input of the comparator is generated by the integrator and is tapped at the integrator output. Thus, the comparator input voltage is equal to an output voltage of the integrator.

In an embodiment, one charge package of the charge packages provided in the start phase typically results in a predetermined voltage difference of the comparator input voltage. Advantageously, in the start phase, the comparator input voltage is brought close to the comparator switching point either from the positive side or the negative side. At the end of the start phase, the deviation of the comparator input voltage from the comparator switching point may be less than the predetermined voltage difference.

In an embodiment, at the beginning of the start phase, the comparator input voltage may be higher than the comparator switching point. Thus, the charge packages are set in such a manner that the comparator input voltage is reduced, until the comparator input voltage crosses the comparator switching point and becomes equal or smaller than the comparator switching point.

In an alternative embodiment, at the beginning of the start phase, the comparator input voltage is smaller than the comparator switching point and the charge packages are set in such a manner that the comparator input voltage is increased, until the comparator input voltage crosses the comparator switching point and becomes equal or larger than the comparator switching point.

In an embodiment, a measuring phase follows the start phase. In the measuring phase, the photodiode provides a photocurrent to the integrator input.

In an embodiment, the optical sensor arrangement comprises a first switch that couples the photodiode to the integrator input. In the start phase, the first switch is set in a non-conducting state. In the measuring phase, the first switch is set in a conducting state. The measuring phase follows the start phase. Thus, the photodiode exclusively provides a photocurrent to the integrator input in the measuring phase and not in the start phase.

In an embodiment, the optical sensor arrangement comprises a second switch that couples the photodiode to a reference potential terminal, a voltage source or a reference source. In the start phase, the second switch is set in a conducting state. In the measuring phase, the second switch is set in a non-conducting state.

In an alternative embodiment, in the start phase, the first switch may be set in a conducting state and the second switch may be set in a non-conducting state. The photodiode may provide the photocurrent to the integrator input in the measuring phase and in the start phase. A possible error caused by the photocurrent may be low in case of a short duration of the start phase and/or low light conditions.

In an embodiment, the reference capacitor circuit is designed to selectively provide at least two different charge values of the charge package to the integrator input.

The reference capacitor circuit may comprise a reference capacitor.

In an embodiment, the reference capacitor is controllable and can obtain at least two different capacitance values. The at least two different capacitance values can be set by a capacitor control signal.

In an embodiment, the reference capacitor circuit comprises a first reference switch coupling a first electrode of the reference capacitor to the integrator input, a second reference switch coupling the first electrode of the reference capacitor to a reference terminal, a third reference switch coupling a second electrode of the reference capacitor to a reference source terminal and a fourth reference switch coupling the second electrode of the reference capacitor to the reference terminal.

In an embodiment, at least two different reference voltages can selectively be provided to the reference source terminal. Thus, by selecting one reference voltage out of the at least two different reference voltages, the charge value of the charge package provided by the reference capacitor circuit is set. Optionally, the at least two different reference voltages have different amounts but the same sign.

In an alternative embodiment, the third reference switch provides a first reference voltage to the second electrode of the reference capacitor. The first reference voltage is tapped at the reference source terminal. The reference capacitor circuit comprises a fifth reference switch that provides a second reference voltage to the second electrode of the reference capacitor.

The reference capacitor circuit may comprise a charge voltage divider at which the at least two different reference voltages can be tapped.

In an embodiment, the integrator comprises an amplifier having an input coupled to the integrator input and an output coupled to the integrator output.

In an embodiment, the integrator comprises an integrator capacitor that is coupled to the input of the amplifier and to the output of the amplifier.

In an embodiment, the integrator comprises an integrator switch coupling the integrator capacitor to the output of the amplifier.

In an embodiment, the integrator comprises a further integrator switch coupling a node between the integrator capacitor and the integrator switch to a voltage terminal.

In an embodiment, the optical sensor arrangement comprises a de-charging switch coupling the integrator input to a reference potential terminal.

In an embodiment, a comparator threshold voltage is applied to a second input of the comparator for setting the comparator switching point. For example, the optical sensor arrangement may comprises a voltage source coupled to the second input of the comparator for setting the comparator switching point.

In an embodiment, an optical sensor arrangement comprises a photodiode, an integrator with an integrator input, a first switch that couples the photodiode to the integrator input, a comparator with a first input coupled to an integrator output of the integrator, a control circuit having an input connected to an output of the comparator, and a reference capacitor circuit that is coupled to the integrator input and is designed to provide a charge package to the integrator input. A comparator input voltage is generated by the integrator and is tapped at the first input of the comparator. The comparator generates a comparator signal that is provided to the control circuit. In a start phase, charge packages are provided to the integrator input by the reference capacitor circuit, until the comparator input voltage crosses a comparator switching point of the comparator.

In a further development, the control circuit is connected on its output side to the reference capacitor circuit. In the start phase, the control circuit may stop providing a further charge package to the integrator input, when the comparator input voltage crosses the comparator switching point of the comparator. In the start phase, the control circuit may control the reference capacitor circuit such that the reference capacitor circuit stops providing a further charge package to the integrator input, when the comparator input voltage crosses the comparator switching point of the comparator.

In an embodiment, a method for light sensing comprises that in a start phase charge packages are provided by a reference capacitor circuit to an integrator input of an integrator, until a comparator input voltage at a first input of a comparator crosses a comparator switching point. The first input of the comparator is coupled to an integrator output of the integrator. Moreover, in a measuring phase, a photocurrent is provided by a photodiode to the integrator input.

Thus, the comparator input voltage only differs to a small extent from the comparator switching point at the end of the start phase. Advantageously, the integrator comparator and the reference capacitor circuit are operating in the start phase, thus any transient signals generated by switching on the comparator, the integrator or the reference capacitor circuit are avoided at the transition from the start phase to the measuring phase.

In an embodiment, if at the beginning of the start phase the comparator input voltage is only slightly above the comparator switching point, only one charge package is provided to the integrator input.

In an embodiment, a control circuit of the optical sensor arrangement detects the crossing of the comparator switching point and stops providing a further charge package to the integrator input in the start phase.

In an embodiment, the photocurrent of the photodiode is not provided to the integrator input in the start phase.

In an embodiment, the photocurrent is provided to the integrator input in the measuring phase resulting in a rise of the comparator input voltage above the comparator switching point. A comparator signal generated at the output of the comparator triggers the reference capacitor circuit such that the reference capacitor circuit provides a charge package to the integrator input. A high value of the photocurrent results in a high number of pulses of the comparator signal and a small distance of the pulses of the comparator signal in the measuring phase. Thus, the comparator signal obtains a high frequency. A low value of the photocurrent results in a small number of pulses and in a long distance of the pulses of the comparator signal and thus in a low frequency of the comparator signal in the measuring phase. Thus, the number of pulses of the comparator signal and the frequency of the comparator signal in the measuring phase is proportional to the value of the photocurrent. The measuring phase has a predetermined integration duration.

Advantageously, the optical sensor arrangement realises a linearity improvement for the light to frequency machine, abbreviated LTF machine, also called light-to-frequency modulator, abbreviated LTF modulator.

BRIEF DESCRIPTION OF THE DRAWINGS

The following description of figures of exemplary embodiments may further illustrate and explain aspects of the application. Devices and circuit parts with the same structure and the same effect, respectively, appear with equivalent reference symbols. In so far as devices or circuit parts correspond to one another in terms of their function in different figures, the description thereof is not repeated for each of the following figures.

DETAILED DESCRIPTION

Figure 1A:
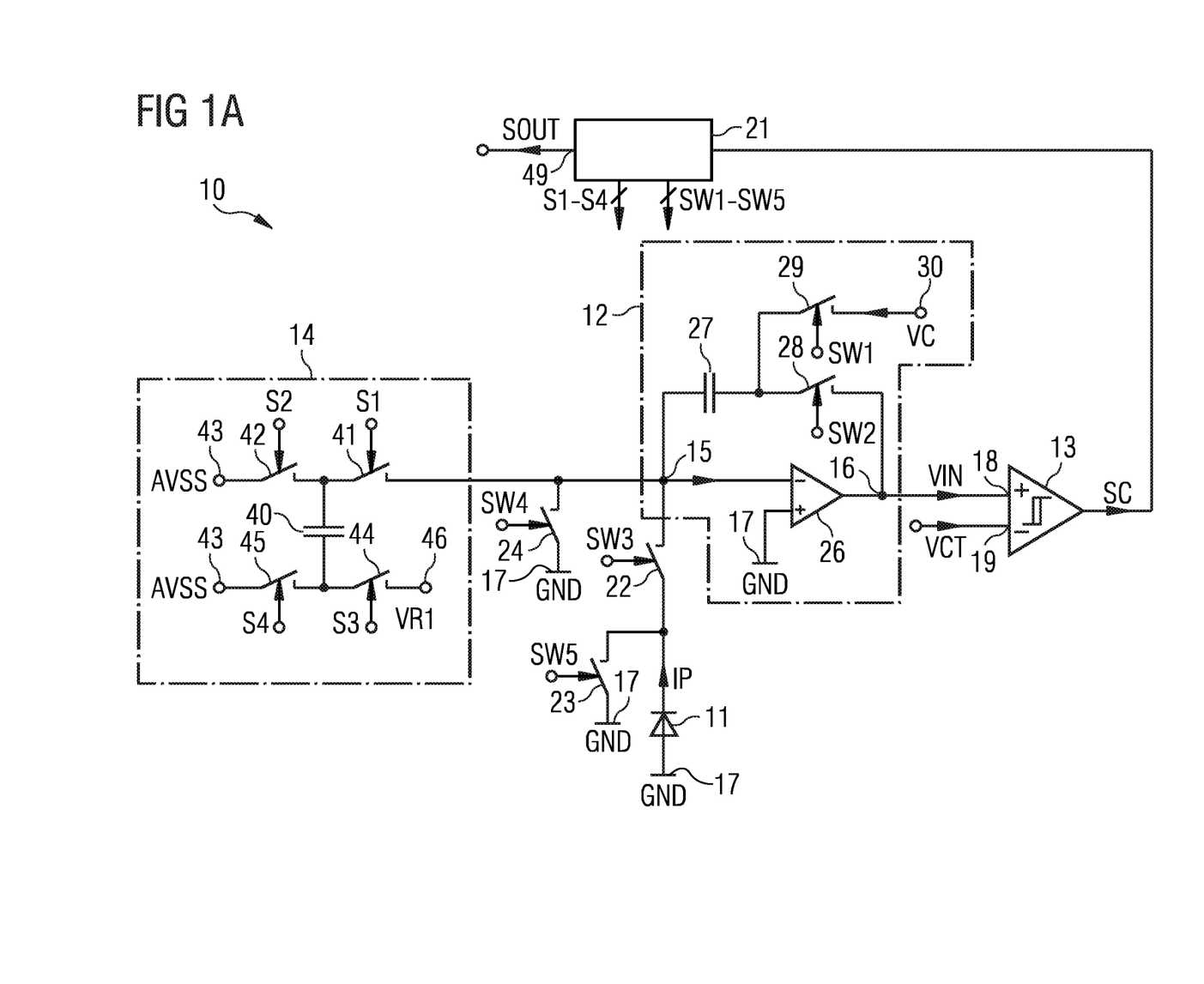
FIGS. 1A and 1B show exemplary embodiments of an optical sensor arrangement.

FIG. 1A shows an exemplary embodiment of an optical sensor arrangement 10 comprising a photodiode 11, an integrator 12, a comparator 13 and a reference capacitor circuit 14. In FIG. 1A, a simple block diagram of the LTF machine 10 is illustrated. The integrator 12 comprises an integrator input 15 and an integrator output 16. The integrator input 15 is coupled to the photodiode 11. The integrator output 16 is connected to a first input 18 of the comparator 13. Moreover, the optical sensor arrangement 10 comprises a control circuit 21 having an input connected to an output of the comparator 13.

The optical sensor arrangement 10 comprises a first switch 22 that is arranged between the photodiode 11 and the integrator input 15. An anode of the photodiode 11 is connected to a reference potential terminal 17. A cathode of the photodiode 11 is coupled via the first switch 22 to the integrator input 15. Moreover, the optical sensor arrangement 10 comprises a second switch 23 that couples the photodiode 11 to the reference potential terminal 17. Thus, the second switch 23 couples a node between the first switch 22 and the photodiode 11 to the reference potential terminal 17. Additionally, a de-charging switch 24 is arranged between the integrator input 15 and the reference potential terminal 17.

The integrator 12 comprises an amplifier 26 and an integrator capacitor 27. An input of the amplifier 26 is directly connected to the integrator input 15. An output of the amplifier 26 is directly connected to the integrator output 16. The input of the amplifier 26 may be realized as an inverting input. A further input of the amplifier 26 is connected to the reference potential terminal 17. The further input of the amplifier may be realized as a non-inverting input. A first electrode of the integrator capacitor 27 is connected to the integrator input 15 and thus to the input of the amplifier 26. A second electrode of the integrator capacitor is coupled to the output of the amplifier 26 and thus to the integrator output 16.

The integrator 12 comprises an integrator switch 28. The integrator switch 28 couples the second electrode of the integrator capacitor 27 to the output of the amplifier 26 and thus to the integrator output 16. A node between the integrator capacitor 27 and the integrator switch 28 is coupled via a further integrator switch 29 to a voltage terminal 30. In an example, the voltage terminal 30 may be connected to a second input 19 of the comparator 13.

The reference capacitor circuit 14 comprises a reference capacitor 40 having a first and a second electrode. A first reference switch 41 of the reference capacitor circuit 14 couples the first electrode of the reference capacitor 40 to the integrator input 15. A second reference switch 42 couples the first electrode of the reference capacitor 40 to a reference terminal 43. Moreover, the reference capacitor circuit 14 comprises a third reference switch 44 coupling the second electrode of the reference capacitor 40 to a reference source terminal 46. Furthermore, a fourth reference switch 45 of the reference capacitor circuit 14 couples the second electrode of the reference capacitor 40 to the reference terminal 43.

The control circuit 21 is connected on its output side to the reference capacitor circuit 14. Outputs of the control circuit 21 are connected to the control terminals of the first to the fourth reference switches 41, 42, 44, 45, the first switch 22, the second switch 23, the de-charging switch 24, the integrator switch 28 and the further integrator switch 29. Moreover, the control circuit 21 comprises a signal output 49.

A comparator threshold voltage VCT is applied to the second input 19 of the comparator 13. The comparator threshold voltage VCT sets a comparator switching point of the comparator 13. The comparator threshold voltage VCT may be equal to the comparator switching point. The comparator 13 generates a comparator signal SC. The comparator signal SC is implemented as a light-to-frequency output signal, abbreviated LTF-OUT. The comparator signal SC is provided to the control circuit 21. The control circuit 21 generates an output signal SOUT at the signal output 49 as a function of the comparator signal SC. The control circuit 21 generates reference control signals S1 to S4, switch control signals SW1 to SW5 and provide said control signals to the control terminals of the switches 22 to 24, 28, 29, 41, 42, 44, 45.

A terminal voltage VC can be tapped at the voltage terminal 30 and is applied to the further integrator switch 29. A not-shown voltage source may be connected to the voltage terminal 30 and may generate the terminal voltage VC. The voltage source may also be connected to the second input 19 of the comparator 13. In this case, the terminal voltage VC may be equal to the comparator threshold voltage VCT.

A reference potential GND can be tapped at the reference potential terminal 17. The reference potential GND is provided to the further input of the amplifier 26. A reference signal AVSS is provided to the reference terminal 43. The reference signal AVSS may be equal to the reference potential GND. A first reference voltage VR1 is tapped at the reference source terminal 46. The first reference voltage VR1 is provided to the third reference switch 44.

A comparator input voltage VIN can be tapped at the integrator output 16 and, thus, at the first input 18 of the comparator 13. The comparator signal SC is a function of the difference between the comparator input voltage VIN and the comparator threshold voltage VCT or the comparator switching point. If the comparator input voltage VIN is higher than the comparator threshold voltage VCT or the comparator switching point, then the comparator 13 generates the comparator signal SC with a first logical value.

In an embodiment, the second input 19 of the comparator 13 is connected to a voltage source, not shown. The voltage source is arranged between the second input 19 of the comparator 13 and the reference potential terminal 17. The voltage source generates the comparator threshold voltage VCT that sets the comparator switching point of the comparator 30.

The comparator threshold voltage VCT may be different from the terminal voltage VC.

In an alternative, not shown embodiment, the reference capacitor 40 is controllable. A capacitor control signal may select one capacitance value of at least two different capacitance values of the reference capacitor 40. Thus, a charge package provided by the reference capacitor circuit 14 selectively has one of at least two different charge values.

In an embodiment, the comparator 13 may be realized as Schmitt trigger circuit or monostable circuit.

Figure 1B:
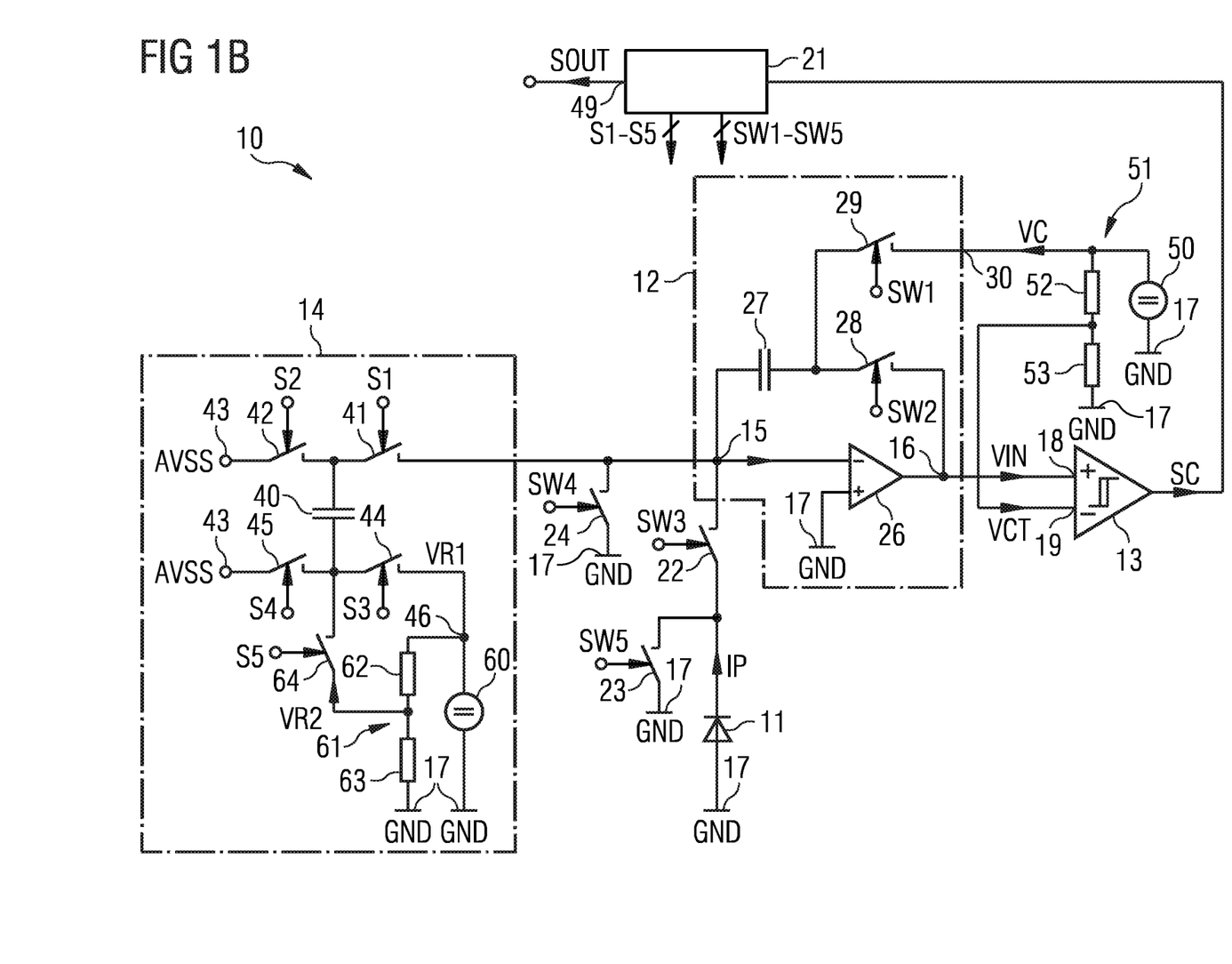

FIG. 1B shows an exemplary embodiment of the optical sensor arrangement 10 that is a further development of the optical sensor arrangement shown in FIG. 1A. The optical sensor arrangement 10 comprises a voltage source 50 that is connected to the voltage terminal 30. The voltage source 50 may be realized as a reference voltage source, e.g. as a bandgap circuit. The optical sensor arrangement 10 comprises a comparator voltage divider 51 coupling the voltage source 50 to the reference potential terminal 17. The comparator voltage divider 51 comprises two divider resistors 52, 53. A tap of the comparator voltage divider 51 is between the two divider resistors 52, 53 and is connected to the second input 19 of the comparator 13. The voltage source 50 is connected to the further integrator switch 29.

Thus, the voltage source 50 provides the terminal voltage VC to the further integrator switch 29. At the tap of the comparator voltage divider 51, the comparator threshold voltage VCT is provided that is applied to the second input 19 of the comparator 13. The comparator threshold voltage VCT is smaller than the terminal voltage VC. Thus, at the beginning of a start phase A that is described below, the comparator input voltage VIN is higher than the comparator threshold voltage VCT.

Moreover, the optical sensor arrangement 10 comprises a reference source 60 that is connected to the reference source terminal 46. The reference source 60 may be realized as a reference voltage source, e.g. as a bandgap circuit. A reference source divider 61 of the optical sensor arrangement 10 couples the reference source 60 to the reference potential terminal 17 and comprises two divider resistors 62, 63. A tap of the reference source divider 61 is between the two divider resistors 62, 63 and is coupled via a fifth reference switch 64 of the reference capacitor circuit 14 to the second electrode of the reference capacitor 40.

Thus, the reference source 60 generates the first reference voltage VR1 that can be provided via the fourth reference switch 44 to the second electrode of the reference capacitor 14. At the tap of the reference source divider 61, a second reference voltage VR2 is generated that can be provided via the fifth reference switch 64 to the second electrode of the reference capacitor 40. The second reference voltage VR2 is smaller than the first reference voltage VR1.

Figure 2:
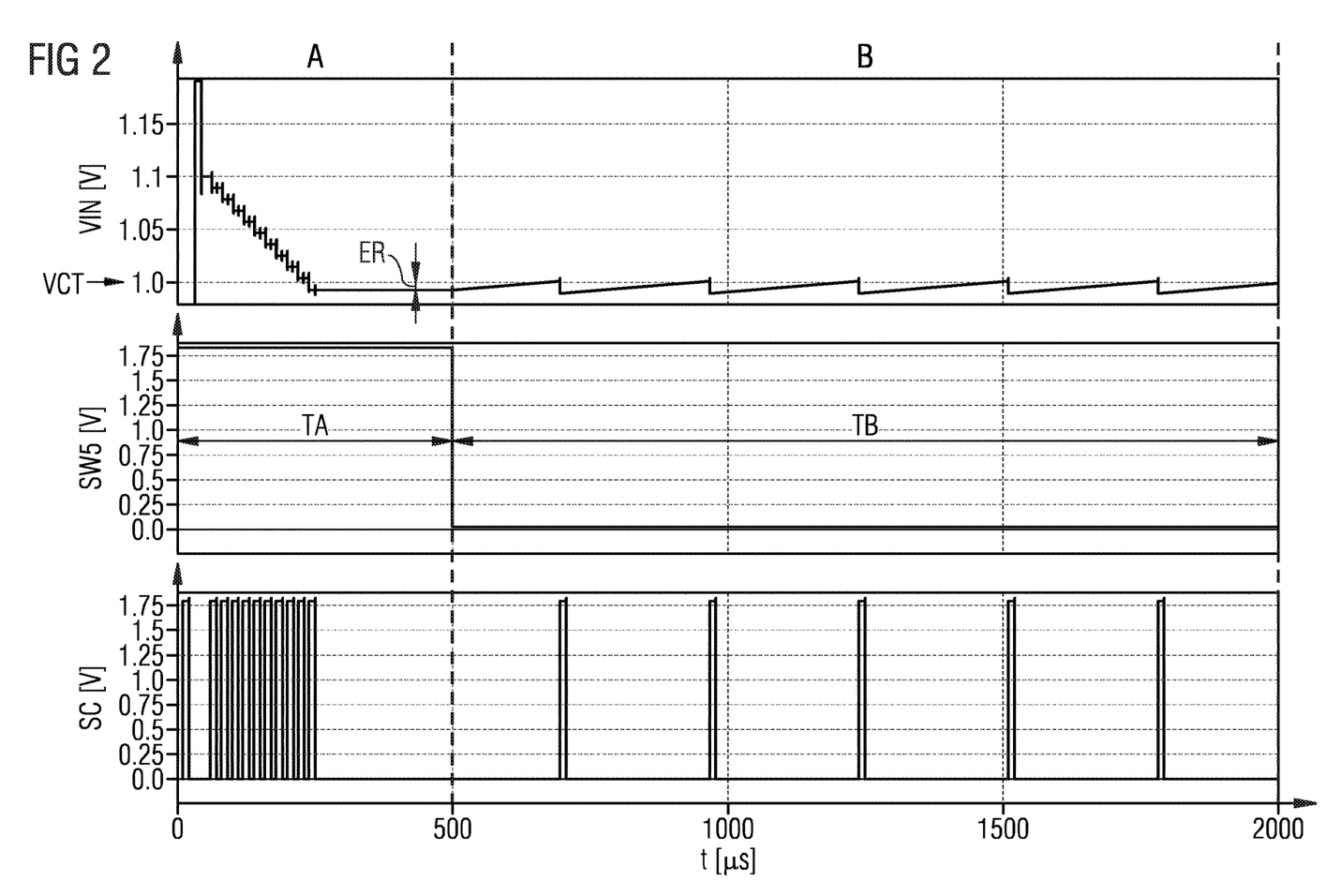
FIGS. 2 and 3 show exemplary embodiments of timing diagrams of signals of an optical sensor arrangement.

FIG. 2 shows an exemplary embodiment of a timing diagram of signals of the optical sensor arrangement 10 shown in FIGS. 1A and 1B. In FIG. 2, the comparator input voltage VIN, the switch control signal SW5 that is provided to the second switch 23 and the comparator signal SC are shown as a function of time t. A measuring phase B follows the start phase A. During the start phase A, the switch control signal SW5 has a value setting the second switch 23 in a conducting state. Contrary to that, in the measuring phase B, the switch control signal SW5 has a value setting the second switch 23 in a non-conducting state. Thus, the photodiode 11 provides a photocurrent IP to the reference potential terminal 17 in the start phase A and applies the photocurrent IP to the integrator input 15 in the measuring phase B.

At the beginning of the start phase A, the first integrator switch 29 and the de-charge switch 24 are set in a conducting state. Thus, the integrator capacitor 27 is charged and the terminal voltage VC is applied between the second and the first electrode of the integrator capacitor 27. Then, the further integrator switch 30 and the de-charging switch 24 are set in a non-conducting state. The integrator switch 28 is set in a conducting state. Thus, the voltage at the second electrode of the integrator capacitor 27 is provided via the integrator switch 28 to the integrator output 16 and consequently to the first input 18 of the comparator 13. At the beginning of the start phase A, the comparator input voltage VIN has a high value. The terminal voltage VC is selected such that the comparator input voltage VIN is higher than the comparator switching point. The comparator signal SC obtains a first logical value that indicates that the comparator input voltage VIN is higher than the comparator switching point.

The comparator signal SC is provided to the control circuit 21 that triggers the reference capacitor circuit 14 such that the reference capacitor circuit 14 provides one charge package to the integrator input 15. By the charge package, the comparator input voltage VIN is decreased by a predetermined voltage difference. Since the comparator input voltage VIN is still higher than the comparator switching point, the comparator signal SC again provides the first logical value, and a further charge package is generated by the reference capacitor circuit 14. This procedure is repeated until the comparator input voltage VIN is reduced by a charge package such that the comparator input voltage VIN drops below the comparator switching point. Therefore, the comparator signal SC obtains the second logical value indicating that the comparator input voltage VIN is lower than the comparator switching point.

For charging the reference capacitor 40, the second and the third reference switch 42, 44 are set in a conducting state and the first and the fourth reference switch 41, 45 are set in a non-conducting state by reference control signals S1 to S4. For providing the charge package to the integrator input 15, the second and the third reference switch 42, 44 are set in a non-conducting state and the first and the fourth reference switch 41, 45 are set in a conducting state by the reference control signals S1 to S4. The charge package has a charge value QREF:

$$QREF = VR1 \cdot CREF,$$

wherein VR1 is the voltage value of the first reference voltage and CREF is the capacitance value of the reference capacitor 40. The charge package has the opposite polarity than the photocurrent IP.

As can be seen in FIG. 2, at the end of the start phase A, the comparator input voltage VIN is only slightly below the comparator switching point. In the example shown in FIG. 2, the comparator threshold voltage VCT that is equal to the comparator switching point has the value of 1.0 V. Advantageously, the starting point of the LTF machine 10 is well-defined and independent of external light conditions that may influence the photocurrent IP. Thus, the output of the amplifier 26 of the integrator 12 which is equal to the comparator input voltage VIN is well-defined and independent of external light conditions.

In the measuring phase B, the photodiode 11 provides the photocurrent IP to the integrator input 15 and thus the comparator input voltage VIN rises. At the point of time when the comparator input voltage VIN has a value higher or identical with the comparator switching point, the comparator signal SC generates a pulse. The pulse in the comparator signal SC triggers the control circuit 21 to provide one charge package by the reference capacitor circuit 14 to the integrator input 15. Thus, the comparator input voltage VIN is decreased. The rise of the comparator input voltage VIN caused by the photocurrent IP, the pulses of the comparator signal SC and the triggering of the reference capacitor circuit 14 is repeated until the end of the measuring phase B.

The start phase A has a predetermined duration TA. The measuring phase B has a predetermined integration duration TB. The number of pulses generated during the measuring phase B is a function of the value of the photocurrent IP and thus of the light received by the photodiode 11. The output signal SOUT of the control circuit 21 may be equal to the comparator signal SC in the measuring phase B. A frequency f of the comparator signal SC, and thus of the output signal SOUT, can be calculated according to the following equation:

$$f = N/TB,$$

wherein N is the number of pulses during the measuring phase B and TB is the integration duration.

As can be seen in FIG. 2, the comparator signal SC may be realized as a pulsed signal. Thus, the comparator SC obtains the first logical value only for a predetermined duration. Otherwise the comparator SC obtains the second logical value.

The comparator input voltage VIN has a value at the end of the start phase A and during the measuring phase B according to the following equation:

$$VCT - \Delta V \leq VIN \leq VCT,$$

wherein VCT is a value of the comparator threshold voltage which is equal to the comparator switching point and ΔV is a difference voltage value. The difference voltage value ΔV is the voltage difference which can be obtained by a single charge package provided by the reference capacitor circuit 14. A duration between the start of the measuring phase B and the first pulse is in general smaller than a duration between two pulses, since the comparator input voltage VIN does not start with the value VIN=VCT−ΔV at the beginning of the measuring phase B. At the end of the start phase A, a difference between the comparator input voltage VIN and the comparator threshold voltage VCT is equal to a start error ER. Advantageously, the start error ER has a very low value.

The measuring phase B can be named integration cycle or LTF integration cycle. The integration duration TB is equal to a measurement duration. According to FIG. 2, the integrator starting point is set to a level above the comparator switching point and the defined charge, which is also used during the active LTF integration time, brings the integrator level—namely the comparator input voltage VIN—down to the comparator switching point in a defined time, and independent from the external light conditions, before the measuring phase B starts.

By performing the start phase A, an undefined error is avoided and a possible error may amount to a maximum 1 LSB error and can be further reduced by using smaller charge steps which can be directly controlled with the reference voltage provided to the reference capacitor 40. For example, the second reference voltage VR2 may be used in the start phase A and the first reference voltage VR1 may be used in the measuring phase B. The second reference voltage VR2 is smaller than the first reference voltage VR1. Alternatively, the reference capacitor obtain a second capacitance value in the start phase A and a first capacitance value in the measuring phase B. The second capacitance value is smaller than the first capacitance value. Thus, the charge value QREF of one charge package is smaller in the start phase A in comparison to the measuring phase B.

Advantageously, the charge steps which bring the integrator level down to the comparator switching point are provided with the integrator 12 already settled and in a closed loop condition. Without the start phase A, the starting point is only found by charging the integrator capacitor 27 to the comparator switching point and then connecting the charged integrator capacitor 27 to an amplifier 26 which has not been in a closed loop condition previously.

In the LTF machine 10 illustrated in FIGS. 1A and 1B, the pulses of the comparator signal SC are counted for a certain amount of time namely the integration duration TB. The reference capacitor 40 together with the first or the second reference voltage VR1, VR2 defines the charge that is counted during the integration duration TB.

The first to the fourth reference switches 41, 42, 44, 45 are controlled by the control circuit 21 that brings the defined charge into the integrator capacitor 27 or takes it out. The control circuit 21 may comprise a state machine that generates the reference control signals S1 to S4 for the switches 41, 42, 44, 45. The further integrator switch 29 and the de-charging switch 24 are used to define roughly the starting voltage for integration. This starting voltage can be seen at begin of the start phase A.

The first and the second switch 22, 23 are used to connect and disconnect the photodiode 11 from the inverting input of the amplifier 26 at the beginning and at the end of integration that means at the transition from the start phase A to the measuring phase B as well as at the end of the measuring phase B. When the first switch 22 is set in a conducting state, than the second switch 23 is set in a non-conducting state. Correspondingly, when the first switch 22 is set in a non-conducting state, than the second switch 23 may be set in a conducting state.

In FIG. 2, simulation results are shown. At the beginning, the small steps bring the integrator 12 down to the comparator threshold with defined steps (the amplifier 26 is already in closed loop condition). The switch control signal SW5 of the second switch 23 shows when the light sensor arrangement 10 becomes active from the defined starting point to generate the output signal SOUT.

The start point for integration can be well defined. With this defined starting point, the error generated for periodic sampling time is further reduced, where the same method is used as for the starting point just in the other direction.

There may be a rest charge counter operating in a rest charge measuring phase after the end of the measuring phase B. The photodiode 11 is disconnected from the integrator input 15 and a defined amount of charge is added to the integrator 12 as long as the integrator 12 reaches the starting point for integration. This defined charge is counted up to the integrator threshold and gives further bits of information. The optical sensor arrangement 10 detects at which integrator level the optical sensor arrangement 10 stops at the end of the integration cycle B. Thus, a further error is avoided.

In the rest charge measuring phase, the integration is quite simple where the supplies has to be exchanged for the reference capacitor circuit 14: Instead of applying the reference voltage AVSS to the fourth reference switch 45 and of the first reference voltage VR1 to the third reference switch 44, the first reference voltage VR1 is applied to the fourth reference switch 45 and the reference voltage AVSS is provided to the third reference switch 44. To get a higher resolution for the residual charge counting, the first reference voltage VR1 has to be divided by a factor n or has to be smaller than the originally used charge or a smaller reference capacitor 40 is used to reduce the charge package size.

For example, the second reference voltage VR2 generated as shown in FIG. 1B is provided via the fifth reference switch 64 to the reference capacitor 40. Thus, the smaller reference voltage VR2 is used to detect the rest charge. The reference switches 41, 42, 44, 45 are controlled such the charge package has the same polarity than the photocurrent IP. The number of these charge packages are counted by the rest charge counter until the comparator input voltage VIN reaches the comparator switching point. A high rest charge results in a small number.

Figure 3:
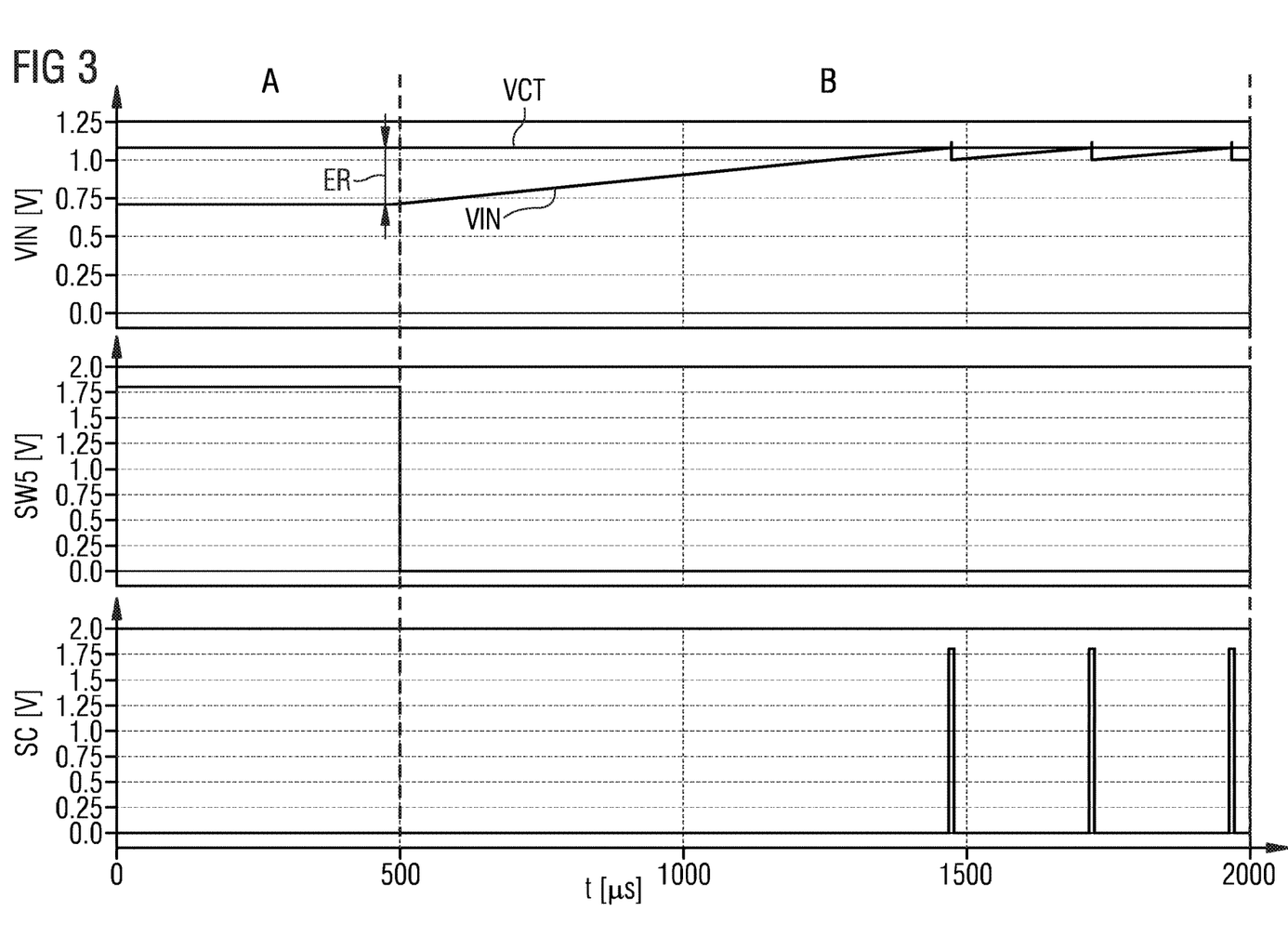

FIG. 3 shows an exemplary embodiment of a timing diagram of the optical sensor arrangement 10. In the start phase A, the comparator input voltage VIN is undefined. The comparator input voltage VIN obtains a value near to the comparator threshold voltage VCT only accidently. For example, the comparator input voltage VIN may have a value that is the comparator threshold voltage VC minus the start error ER. The start error ER has a high value. In this case, the period between the start of the measuring phase B and the first pulse is longer than a duration between two pulses. Thus, at least one pulse is lost in comparison to the signals shown in FIG. 2, e.g. two pulses are lost. The charge packages in FIGS. 2 and 3 are equal.

Without the start phase A, the starting point of the LTF integrator 12 is not well defined due to phenomena of charge injection, amplifier settling etc. The starting point as shown in FIG. 3 is below the comparator switching point of the LTF machine and requires a certain amount of light to generate the first pulse. In order to minimise the error, wait times are introduced before the LTF machine starts counting the pulses. Especially for applications with low light conditions, this wait time should be avoided, since the defined starting point of the optical sensor arrangement 10 is a function of the external light.

The direction where the integrator 12 starts is changed in FIG. 3 in comparison to FIG. 2. Without start phase A, an undefined time is needed before the first pulses will start.

In an arrangement without the start phase A as described in FIGS. 1A, 1B and 2, the photo current IP of the photodiode 11 defines a wait time until the arrangement can start with the LTF integration cycle B. For low light conditions, the wait time can be too short and the arrangement has a negative offset, or in other words, has a high uncertainty when the first pulse in the LTF machine is generated, which is an error in absolute counts. If more machines are working in parallel, this error directly acts as an error in channel matching and this error will be seen for post processing. These errors are avoided by the start phase A as shown in FIG. 2.

The invention claimed is:

1. An optical sensor arrangement, comprising:
   a photodiode,
   an integrator with an integrator input,
   a first switch that couples the photodiode to the integrator input,
   a comparator with a first input coupled to an integrator output of the integrator, and
   a reference capacitor circuit that is coupled to the integrator input and is designed to provide a charge package to the integrator input,
   wherein in a measuring phase, a photocurrent is provided by the photodiode to the integrator input,
   wherein in a start phase, charge packages are provided to the integrator input, until a comparator input voltage at the first input of the comparator crosses a comparator switching point, and
   wherein the measuring phase follows the start phase.

2. The optical sensor arrangement according to claim 1, wherein in the start phase, the first switch is set in a non-conducting state, and in a measuring phase, the first switch is set in a conducting state.

3. The optical sensor arrangement according to claim 1, comprising a second switch that couples the photodiode to a reference potential terminal.

4. The optical sensor arrangement according to claim 1, wherein the reference capacitor circuit is designed to selectively provide at least two different charge values of the charge package to the integrator input.

5. The optical sensor arrangement according to claim 1, wherein the reference capacitor circuit comprises a reference capacitor.

6. The optical sensor arrangement according to claim 5, wherein the reference capacitor is controllable and can obtain at least two different capacitance values.

7. The optical sensor arrangement according to claim 5, wherein the reference capacitor circuit comprises:
   a first reference switch coupling a first electrode of the reference capacitor to the integrator input,
   a second reference switch coupling the first electrode of the reference capacitor to a reference terminal,
   a third reference switch coupling a second electrode of the reference capacitor to a reference source terminal and
   a fourth reference switch coupling the second electrode of the reference capacitor to the reference terminal.

8. The optical sensor arrangement according to claim 7, wherein the reference capacitor circuit is configured to selectively provide at least two different reference voltages to the reference source terminal.

9. The optical sensor arrangement according to claim 1, wherein the integrator comprises an amplifier having
   an input coupled to the integrator input and
   an output coupled to the integrator output, and
   wherein the integrator comprises a integrator capacitor that is coupled between the input of the amplifier and the output of the amplifier.

10. The optical sensor arrangement according to claim 9, wherein the integrator comprises an integrator switch coupling the integrator capacitor to the output of the amplifier.

11. The optical sensor arrangement according to claim 10, wherein the integrator comprises a further integrator switch coupling a node between the integrator capacitor and the integrator switch to a voltage terminal.

12. The optical sensor arrangement according to claim 1, comprising a de-charging switch coupling the integrator input to a reference potential terminal.

13. The optical sensor arrangement according to claim 1, wherein a comparator threshold voltage is applied to a second input of the comparator for setting the comparator switching point.

14. A method for light sensing, comprising:
   in a start phase, providing charge packages by a reference capacitor circuit to an integrator input of an integrator, until a comparator input voltage at a first input of a comparator crosses a comparator switching point, wherein the first input of the comparator is coupled to an integrator output of the integrator, and
   in a measuring phase, providing a photo current of a photodiode to the integrator input,
   wherein the measuring phase follows the start phase, and wherein a first switch couples the photodiode to the integrator input.

* * * * *